May 7, 1968 T. D. TALCOTT ET AL 3,381,735
DEFLATION-PROOF VEHICLE TIRES

Filed May 5, 1966 2 Sheets-Sheet 1

INVENTORS.
Thomas D. Talcott
BY Richard F. Smith

ATTORNEY

United States Patent Office 3,381,735
Patented May 7, 1968

3,381,735
DEFLATION-PROOF VEHICLE TIRES
Thomas D. Talcott, Midland, and Richard F. Smith, Bay City, Mich., assignors to Dow Corning Corporation, Midland, Mich., a corporation of Michigan
Filed May 5, 1966, Ser. No. 547,842
7 Claims. (Cl. 152—313)

ABSTRACT OF THE DISCLOSURE

An automotive vehicle tire comprising a casing and a filler material confined at least in part by the casing, the filler material being a foamed elastomer having voids therein. The elastomer having a Bashore resilience versus temperature characteristic which has a major maximum point above a line defined by 55 percent at 112° F. and 40 at 472° F., a compression set less than 50 at all operating temperatures, and a minimum tear strength of 2.5 pounds per inch at all operating temperatures. Examples of suitable foamed materials include ethylene-propylene terpolymer, polyisoprene, polybutadiene, and silicone rubber.

---

Figure 1:
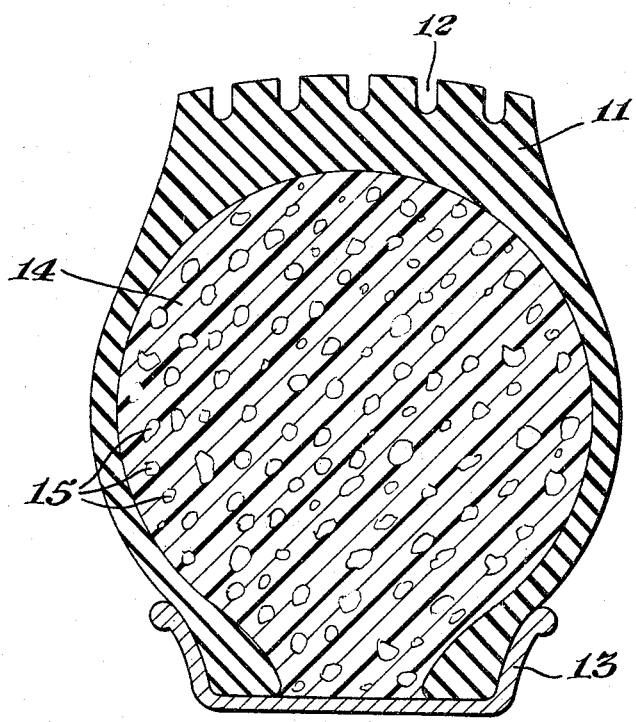

The present invention relates to land vehicle tires and more particularly to improved vehicle tire constructions and materials aimed at making resilient vehicle tires deflation proof.

In order to prevent excessive vibration and shock to wheeled vehicles travelling in contact with land and to provide comfort for the passengers of such vehicles it has long been common practice to provide resilient tires on land vehicle wheels. The pneumatic tire is by far the most popular resilient device for this purpose. It has long been realized, however, that pneumatic tires are subject to deflation due to punctures and other types of damage.

Numerous types of constructions for resilient tires have been developed in the hope of eliminating "flat" tires. See, for example, the various constructions described in U.S. Patent No. 3,022,810. None has been completely satisfactory as evidenced by the fact that virtually all automobiles still carry spare tires and are inflated by air. While the problem certainly exists with respect to ordinary passenger vehicles, it becomes even more acute on military and emergency vehicles where delay for changing tires may cost lives and property, and on large vehicles where heavy equipment is required to change tires. With respect to tires on military vehicles in particular the danger of deflation by various projectiles is particularly acute. A survey of this problem and attempts at solving it are described, for example, in U.S. Department of Defense report No. AD 283 992 which has been released by the Armed Services Technical Information Agency.

One approach to the problem which has been tried many times in many ways is that of providing a resilient tire filler having other than a solely gaseous form. These fillers include, for example, foams, sponges, balls, segments, liquids, and highly resilient solids. In the event that voids exist in particular constructions the more recent attempts generally rely on pressure of air or other gas in the voids for support of the vehicle. Numerous specially designed tire constructions aimed at alleviating these problems have also been devised. To date, however, no construction has been sufficiently satisfactory to achieve general usage even in limited applications where the problem of deflation-proof tires is most acute. The primary problems with all prior art constructions studied by the present applicants are the fact that for those constructions which are at least apparently capable of completely preventing deflation, the filler materials quickly break down in use thereby eliminating support, or abrade the tire casing, thus weakening it. If voids within the material are pressurized, as soon as damage occurs the gases in the voids diffuse to the damaged area and are released, again eliminating support.

The present invention has for a primary object the provision of an improved deflation-proof resilient tire construction.

A further object is the provision of resilient vehicle tires having filler materials which are not subject to early degradation in use and which do not weaken the side walls of the tire casing.

Another object is the provision of tires capable of supporting a vehicle for long periods at high speeds and high loads even after damage.

In accordance with these and other objects there is provided by the present invention a resilient tire having a casing filled with voids defined and surrounded by an elastomeric material having predetermined physical characteristics which provide the necessary qualities for long life in use. The elastomeric material by itself provides vehicular support. The material, surprisingly, may be any of a variety of polymeric materials so long as the required physical characteristics are present. Preferably, the material is simply foamed in place in the tire casing and then vulcanized. Construction therefore is relatively simple and economical.

Figure 2:
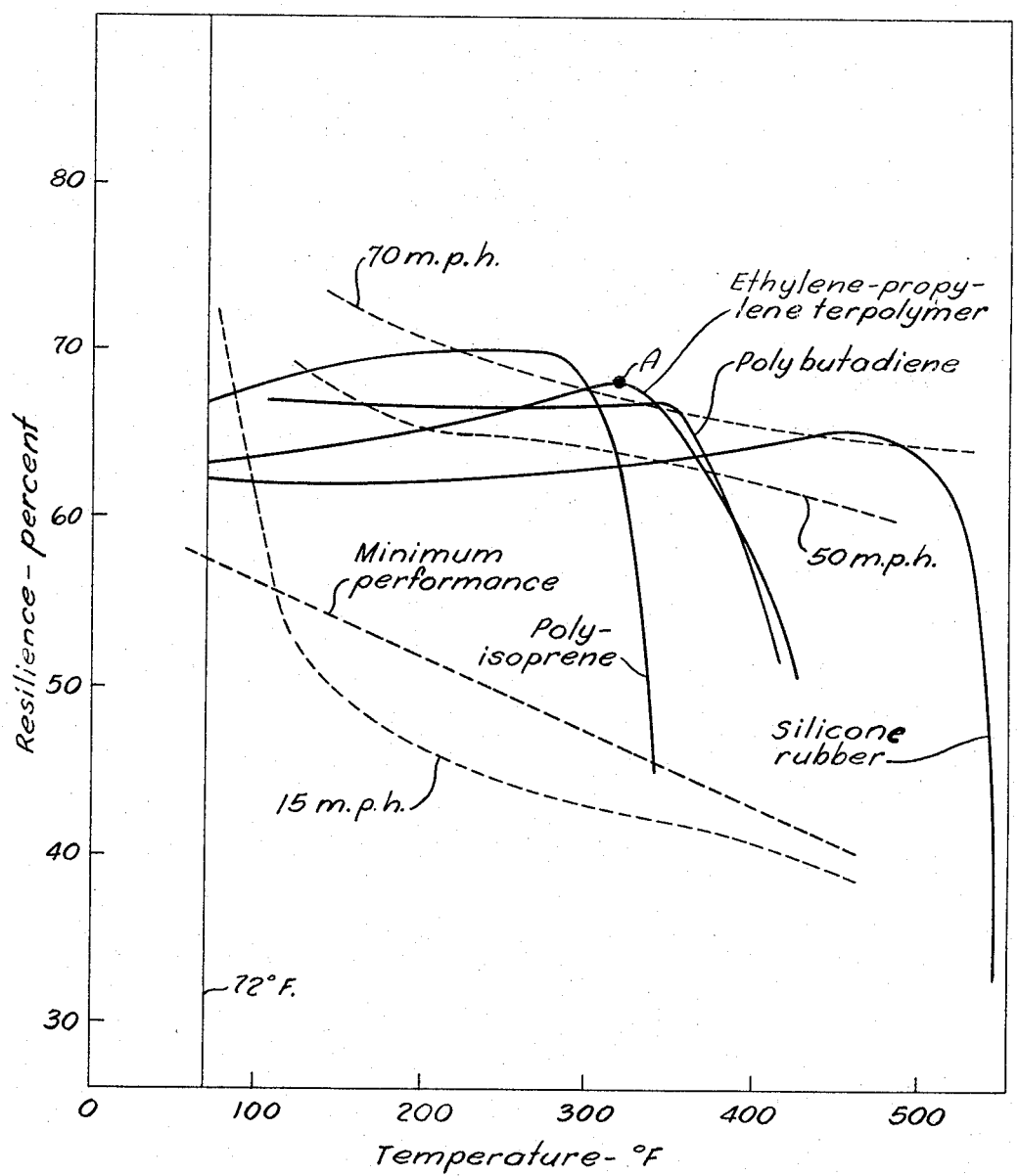

Other objects and attendant advantages of the invention will become obvious to those skilled in the art as the invention becomes better understood from a consideration of the following detailed description when read in conjunction with the accompanying drawings wherein FIG. 1 is a cross-sectional view of a conventional tire casing mounted on a vehicle wheel rim and filled in accordance with the present invention, and FIG. 2 is a graph showing variation of resilience with temperature for various materials and illustrating the resilience criteria for tire filler materials.

As shown in FIG. 1 of the drawing, a conventional tire casing 11 having road engaging tread 12 thereon is mounted on a rim 13 of a vehicle wheel (not shown). In accordance with the present invention, the space confined by the rim 13 and casing 11 is filled with an elastomeric material 14 which defines a plurality of voids 15 therein. The elastomeric material supports the weight of the vehicle on which the wheel is mounted. In its simplest form, the elastomeric material 14 is a cured synthetic rubber foam, the voids 15 being the bubbles in the foam. The elastomeric material having the voids therein may be any of a variety of materials. However, certain physical characteristic must be met by this material. It is known that many physical parameters may be measured to provide characteristics of elastomeric material. It has been found that a number of these parameters have, however, little effect in the selection of elastomeric-filler materials for use in vehicle tires.

In tests of various fillers it has been found by the applicants that failure of a tire insert will be caused by tear of the filler material, by reversion of foam elastomer to a semisolid or semiliquid state, or by compression set (or permanent set) of the material, or by a combination of two or more of these degradations. This is true irregardless of the type of elastomer used to form the filler.

The possibility of failure due to tear of the filler material can be eliminated by providing material with sufficient tear strength to prevent tearing in use. It has been found that tear strength varies considerably with temperature and must therefore be measured at temperatures which are substantially those which will be reached under steady state operating conditions in the tire.

The reversion characteristic of the filler material is determined by the temperature of the material under operating conditions. As a tire rotates on a vehicle wheel, it is cyclically compressed at a rate dependent upon the vehicle speed. Due to internal friction, or hysteresis, in the filler material there is heat buildup in the material. Noncyclical distortions due to uneven terrain and turning of the vehicle also cause heat buildup in like manner. The ultimate temperature reached in the tire depends on the heat generated by hysteresis and on the thermal conductivity of the filler which causes heat to flow out of the filler as well as on ambient temperatures and tire size.

Compression set is determined by the amount of degradation of the filler material under elevated temperature conditions and mechanical strain. These factors cause breaking of chemical bonds in the material thereby weakening it and allowing the material when stressed to exhibit different elastic behavior.

Thus, it will be realized that temperature buildup in the filler material of the tire as the tire is used under operating conditions must be predicted in advance for any given elastomer. It has been found that such prediction is practical and that any elastomer having certain predetermined physical parameters can be used to make tire fillers capable of being run for long distances even after physical damage by foreign objects such as projectiles.

One controlling parameter is the measurement of energy stored divided by energy stored plus energy dissipated in a material sample. This is a measure of the resilience of the material and is expressed as a percentage. It will be realized that the denominator of the parameter, i.e., energy stored + energy dissipated, is equal to the total energy supplied to the material. The numerator, i.e., energy stored, is proportional to the energy stored in the tire, and 100 minus the resilience is a measure of the heat dissipated.

The resilience of elastomeric materials varies with temperature and must be therefore determined over the range of possible operating temperatures to obtain a true representation of possible conditions of use. In the case wherein the filler material will be confined within a completely enveloping tire casing when in use the resilience measurement must, to be a valid representation, be made on a sample which has been aged under confined conditions to prevent possible action on the filler material due to ambient conditions not present inside the tire. In other words, the measurements must be made on the filler material under simulated tire conditions. It has been found that sealing of the sample in material such as aluminum foil generally gives a reasonable simulation of actual confinement. In order to compensate for any changes due to ageing, ageing at elevated temperature for 24 hours is recommended before making resilience measurements. The period of 24 hours is the equivalent of over 1600 miles of use at 70 miles per hour. The test sample is then removed from its confinement and its resilience is measured immediately. Measurement of resilience may be made directly by apparatus such as the Bashore Resiliometer marketed by Precision Scientific Company of Chicago, Ill.

FIG. 2 shows a plot of resilience expressed in percent as a function of temperature for void-defining tire filler materials in accordance with the present invention of ethylene-propylene terpolymer, polybutadiene, polyisoprene and dimethyl-methylvinyl silicone rubber. A high initial resilience percentage is indicative of a lower temperature buildup and the shape of the curve indicates the trend of temperature buildup with increasing operating temperatures. A sudden downward slope of the resilience-temperature curve for a given material indicates that a permanent change in the material has taken place or that other factors are affecting the material. The permanent change can also be seen as compression set or reversion.

For conventional tire casings it has been found that to give even a few hundred miles of life at speeds up to about 40 miles per hour the filler material must exhibit a resilience-temperature characteristic having major maximum point above the line defined by 55% resilience at 112° F. (50° C.) and 40% resilience at 482° F. (250° C.). This minimum performance line is shown on FIG. 2.

A set of empirically derived curves showing the resiliency required to reach particular operating temperatures at various speeds is also plotted on the figure. These curves and the minimum performance line all presuppose that the filler material has at least minimum tear resistance, a maximum compression set and a minimum thermal conductivity.

Tear resistance may be measured by the so-called pantleg tear test and is measured at the tire operating temperature. A sheet of test material is formed with a slit in one end. The two portions which are separated by the slit are pulled in opposite directions with increasing force until tearing begins at the end of the slit. The pulling force required to produce such tearing is measured and when divided by the thickness of the material gives a value in units, for example, of pounds per inch or grams per centimeter. It has been found empirically that an absolute minimum tear strength of 2.5 lbs. per inch at operating temperature is necessary for satisfactory performance of a material as a tire filler and a more preferred tear strength for selected materials is at least 9 lbs. per inch.

It has been found that the minimum thermal conductivities of all elastomeric polymers tested fall into a very narrow range equal to about $$0.4 \times 10^{-3} \text{ Cal.}/(\text{sec.}) - (\text{cm.}^2)(° \text{ C.}/\text{cm.})$$

The addition of extending or reinforcing fillers to the polymer tends to increase this value. Hence this characteristic may be neglected in the choice of materials for use in accordance with this invention. If materials having a far greater thermal conductivity were to be used, the operating temperature would necessarily be lower, but any material meeting the criteria set forth herein, would, of course, still function in the tire.

Compression set, while generally having an effect on resilience and therefore causing downward change in slope of the solid curves of FIG. 2, does not always affect resilience in this manner. In some materials even after great compression set, resilience remains high. Hence this characteristic must be measured separately. To simulate conditions in a tire, samples are confined, compressed 20% and held at temperature for 24 hours, then released. The amount of deflection due to the failure of the surface of the material to return to its original position is measured as compression set and expressed as a percentage of the original deflection.

It has been found that a compression set greater than 50% at operating temperature under these tests is an indication that the material will fail in use as a tire filler.

The curves can be used to choose elastomeric filler materials for tires by plotting a temperature vs. resilience characteristic as heretofore explained over a range of from ambient temperature to at least a point where the resilience begins to drop rapidly with rising temperature or about 400–500° F., whichever is less. As mentioned previously, the point at which the resilience begins to drop off rapidly with temperature (a downward slope of the curve) is indicative of permanent change in the material and ultimate failure of the material. Hence the point such as that shown at A on FIG. 2 at which each curve has a zero slope (the point of change in slope from positive to negative) can be considered the cutoff point for safe operation of the tire without degradation.

Choosing now the empirical curve of FIG. 2 which is definitive of the design speed at which the tires are to be used and superimposing the empirical curve on the measured curve for the test material will provide the operating temperature of the test material at the first point where the two curves intersect. Mathematically, of course, this step merely solves the two simultaneous equations of the two curves. An observation of the curve for the test material must now be made to note whether or not the point of intersection, or operating temperature of the material, falls below the knee of the curve, which is the starting point of rapid downward slope with increasing temperature. If the temperature is lower that than of the knee of the curve, or higher than the point of zero slope, the material will perform satisfactorily as a tire filler at and below the design speed if it has sufficient tear strength and resistance to compression set at the operating temperature.

A tear resistance test as heretofore described is now made at the operating temperature determined by the point of intersection of the curves and if the tear strength is at least 2.5 lbs. per inch the material will perform satisfactorily at speeds up to the design speed. In the event that the tire is to be used over extremely rough terrain, however, it is preferred that a material having at least a 9 lb. per inch tear strength be chosen. Compression set at the operating temperature is then measured and if the compression set is not greater than 50% it can be assumed that the material will serve as a tire filler.

The entire reason why an elastomeric tire filler material having the above physical characteristics has the necessary properties to succeed in an application where so many other materials have failed is not completely understood. It is, however, known that certain physical characteristics other than those mentioned above are included in the requisite resilience versus temperature and tear characteristics described above. The cross-linking system of the polymer must be stable under the operating temperature and other conditions reached while in use in the tire. In general, sulfur vulcanized stocks become unstable under these conditions and as the cross-links break down the material quickly loses its characteristics causing breakdown as evidenced by reversion and compression set.

Peroxide vulcanization or resin-curing, on the other hand, generally give more stable cross-linking systems.

Since heat generation within the filler material is a prime factor in establishing the ultimate operating temperature of a material, elastomer stocks which have low rates of heat generation are generally necessary. With this in view, the elastomeric filler generally must have a low internal friction. Since most elastomeric stocks are loaded with solid filler particles which tend to improve strength, toughness, and other properties, these fillers must be chosen also to reduce internal friction insofar as possible. It has been found that solid particles having low structures, such as fine thermal carbonblacks for example, are generally preferred for use in the elastomeric fillers for tires. The material also should generally have a high modulus to aid in eliminating excess compression which would add to the heat generation as the tire is periodically subjected to compression in use Parallel to the change in resilience with temperature which has been described hereinabove, is the change of loss compliance with temperature. Ferry in "Viscoelastic Properties of Polymers," published by John Wiley and Sons, Inc., 1961, p. 436, indicates that the energy dissipated per second in small oscillating deformations is equal to $$\omega J'' P^2 / 2$$

where $\omega$ is the angular frequency in radians/sec., $J''$ is the loss compliance of the material, and P is the peak stress amplitude. Ferry states further that this equation may be used to predict heat buildup in automobile tires.

Under normal circumstances as a tire is used on a vehicle travelling at constant speed, $\omega$ and P are constants, P being dependent on tire loading. Thus $J''$, the loss compliance, is the sole determining factor in heat buildup.

The loss compliance, $J''$, is defined as the strain 90° out of phase with the stress divided by the stress, as $$J'' = \frac{G''}{G'^2 + G''^2}$$

where $G''$=loss modulus and $G'$=storage modulus or stress in phase with the strain divided by the strain. This relationship may also be expressed as $$J'' = \frac{1/G''}{1 + (\tan^2 \delta)^{-1}}$$

where $\delta$ is the phase angle between stress and strain and $\tan \delta = G''/G'$ or a measure of energy dissipated to energy stored, known in the art as the loss tangent. It is particularly to be noted that the heat buildup is not directly proportional to tangent $\delta$, as may be seen from this relationship. $J''$, $G''$, and $G'$ are weak functions of temperature, frequency, and deformation and must be determined under proper conditions similar to those obtained in use in a tire.

It has been found that the measurement of these quantities under proper conditions yields results similar to those given by the resilience characteristic described hereinbefore, and that $J''$ may be used in place of resilience to obtain the conditions at which a given elastomeric material will operate in a tire. Due to the difficulties inherent in measurement, however, of the loss compliance values under simulated tire operating conditions, the criterion expressed in terms of resilience as heretofore described is preferred at present. In the event that the loss compliance is utilized similarly to the method described with respect to resilience to determine operability of a material as a tire filler material, it is to be understood that the minimum tear and maximum compression set values heretofore described must also be adhered to.

By use of the present invention, conventional tire casings may be filled with void defining elastomeric material and become capable of travelling at high rates of speed for great distances while still supporting the vehicle. Since the vehicle weight is supported by the elastomeric walls which define the voids in the tire, there is no loss of air pressure and consequent loss of load bearing ability upon damage.

Alternatively, if desired, the tire casing need be only partially filled with elastomeric foam and a recess left within the casing for inflation with gas such as air. Such construction has an advantage in that the amount of deflection of the tire may be controlled to suit varying loads rather than designing each tire for a particular range of loading as is required when the casing is completely filled with void-defining elastomer. The major disadvantage, however, is that the tire is deflated upon damage and a portion of its load carrying capacity is thereupon lost.

The use of elastomeric foam fillers also allows construction of tires without the need for tire cords. For example, a toroid of elastomeric material may be molded and cured, then a layer of tread elastomer may be molded thereon. Since the foam supports the load the need for cords to restrain the tire casing is obviated. This construction allows ease in manufacture and economy in cost.

The following examples are illustrative of the invention:

EXAMPLE 1

A mixture of 100 parts by weight of a commercial grade of ethylene-propylene-1,5-cyclooctadiene gum, (ethylene-propylene terpolymer) 60 parts by weight of a fine thermal carbon black, 5 parts by weight of zinc oxide powder, 0.3 part by weight of sulfur, 4.5 parts by weight of dicumyl peroxide, and 3.2 parts by weight of a commercial foaming agent was milled, extruded into commercial passenger car tubeless tires and cured after foaming.

This material can be calculated to operate at about 290° F. in a tire at 70 m.p.h. Tests on the foamed material under confined conditions as described hereinabove at 290° F. indicated that the material had a tear strength of 10 pounds per inch, a resilience of 68 percent, a compression set of 33 percent, and a loss compliance ($J''$) of 0.008.

Two of these tires were placed on an automobile passenger vehicle and deflection of the tire was measured. The vehicle was then driven at an average speed of 50 miles per hour with occasional speeds up to 70 miles per hour over a course having uneven surfaces and sharp curves until the tire tread was completely worn off the tire. No measurable change in tire deflection was found. The tires were then cut apart to examine the filler material. No evidence of reversion or tear was found in the filler. The actual mileage the tires were driven was 5,243 miles in this accelerated test. Based on comparisons of life of similar air filled pneumatic tires on the same test course with mileage of the same tire under normal highway conditions, the mileage obtained was calculated to be equivalent to many more miles of normal highway driving on the same type of automobile.

A similarly made tire was placed on a sedan and has been driven over 7500 miles with no sign of failure under highway conditions. A major portion of this distance has been under turnpike conditions.

EXAMPLE 2

Tires made similarly to those of Example 1 were punctured by .30 caliber bullets and 12 gauge shotgun slugs immediately after the tires were mounted on the test vehicle. Tests were run under highway conditions. The bullet holes in the tires had no measurable effect on tire life when compared with undamaged tires driven on the same vehicle at the same time.

EXAMPLE 3

Acceptable results were obtained under the conditions described in Examples 1 and 2 when passenger vehicle tires were filled with foamed elastomers having the following formulations by weight together with a commercial blowing agent and having the physical properties at operating temperature as shown:

Obviously various other modifications and variations are possible in the light of the above teachings. It is to be understood, therefore, that within the scope of the appended claims the invention may be practiced otherwise than as specifically described.

That which is claimed is:

1. In a tire for use on a vehicle wheel, said tire comprising a casing and a filler material confined at least in part by said casing, the improvement comprising:
   said filler material being foamed elastomer having a multiplicity of voids therein,
   said foamed elastomer having a resilience versus temperature characteristic having a major maximum point above a line defined by 55 percent at 112° F. and 40 percent at 472° F.,
   a compression set less than 50 at all operating temperatures and a
   tear strength of at least 2.5 lbs. per inch at all operating temperatures.

2. A tire as defined in claim 1 wherein said filler material is a foamed synthetic rubber.

3. A tire as defined in claim 2 wherein said synthetic rubber is ethylene-propylene terpolymer.

4. A tire as defined in claim 2 wherein said synthetic rubber is silicone polymer.

5. A tire as defined in claim 2 wherein said synthetic rubber is polyisoprene.

6. A tire as defined in claim 2 wherein said synthetic rubber is polybutadiene.

7. A tire as defined in claim 1 wherein said filler material is wholly confined by said casing and the rim of said vehicle wheel.

References Cited

UNITED STATES PATENTS 3,022,810   2/1962   Lambe _____ 152—313

ARTHUR L. LA POINT, *Primary Examiner.*

Y. P. SCHAEVITZ, C. B. LYON, *Assistant Examiners.*

| | | | |
|---|---|---|---|
| Polymer | Polyisoprene (cis) 100 parts. | Dimethyl-methylvinyl (.568 M percent) polysiloxane gum 100 parts. | Polybutadiene 100 parts. |
| Fillers | Fine thermal carbon black 50 parts, zinc-oxide powder 5 parts. | Fume silica 32 parts ground quartz 20 parts. | Fine thermal carbon black 60 parts, zinc-oxide powder 5 parts. |
| Vulcanizing agents | Dicumyl peroxide, 1.5 parts, sulfur 0.3 parts. | 2,5-bis(tertbutyl-peroxy)-2,5 dimethyl hexane 0.6 part. | Dicumyl peroxide 0.5 part. |
| Tear (lb./in.) | 25 | 2.6 | 61 |
| Compression set (percent) | 15 | 50 | 23 |
| Resilience (percent) | 70 | 65 | 68 |
| Op. Temp. at 70 m.p.h., ° F. | 220 | 440 | 330 |